Patented July 30, 1935

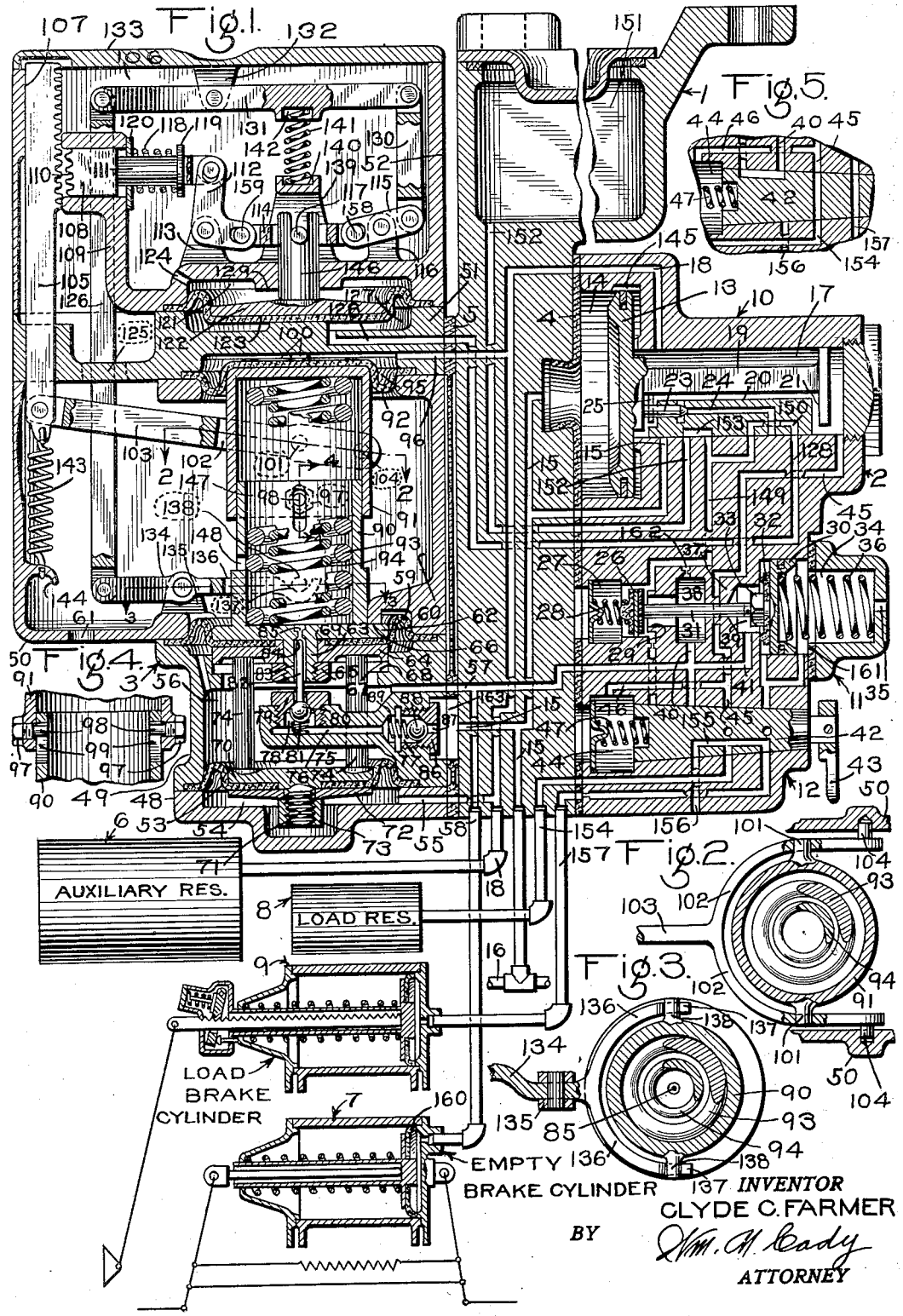

2,009,843

UNITED STATES PATENT OFFICE 2,009,843

FLUID PRESSURE BRAKE

Clyde C. Farmer, Pittsburgh, Pa., assignor to The Westinghouse Air Brake Company, Wilmerding, Pa., a corporation of Pennsylvania Application November 1, 1932, Serial No. 640,645
Renewed March 3, 1934

11 Claims. (Cl. 303—74)

This invention relates to fluid pressure brakes and more particularly to the type adapted to operate to apply and release the brakes in accordance with variations in brake pipe pressure.

It has heretofore been proposed to provide a fluid pressure brake equipment having means controlled by the substantially constant pressure of fluid in a control reservoir, for governing the pressure in the brake cylinder in effecting an application and a release of the brakes, so that the brake cylinder pressure will be properly proportional to the degree of reduction or increase in brake pipe pressure, regardless of leakage of fluid under pressure from the brake cylinder, within a permissible degree, and regardless of variations in travel of the piston in the brake cylinder.

An equipment of the above character is disclosed in my pending application, Serial No. 631,191, filed August 31, 1932, and according to this pending application, the control reservoir, which is charged with fluid at the pressure carried in the brake pipe while the brakes are released, is immediately isolated from the source of fluid pressure supply upon initiating a reduction in brake pipe pressure, so that the pressure of fluid in said reservoir will remain constant while the brakes are applied and thus govern the degree of pressure acting in the brake cylinder.

In controlling a train down a long descending grade it is customary, after initially applying the brakes, to recharge the brake system in order to be able to effect another application of the brakes. While the brake system is being recharged, the brakes on the train are being released and in order to prevent the train from accelerating to a degree beyond control during the recharging period, it is usually necessary to effect another application of the brakes before the initial application is completely released and before the brake system is fully recharged.

Since, in the brake equipment disclosed in the above mentioned pending application, the control reservoir is adapted to be charged only when the equipment is substantially fully charged, which is not likely to occur when descending a grade, any leakage of fluid under pressure from the control reservoir during the grade descending period reduces the control reservoir pressure so that after the initial application of brakes, the brake cylinder pressure obtained upon a further application will be lower than intended by a degree proportionate to the degree of reduction in the control reservoir pressure. In case of severe leakage of fluid under pressure from the control reservoir on some cars in a train, the brake cylinder pressure obtained on those cars upon a reapplication of the brakes might be so low as to be of little or no value, on other cars where there was no leakage of fluid under pressure from the control reservoir the intended brake cylinder pressure would be obtained, while on still other cars where intermediate degrees of leakage of fluid under pressure from the control reservoir was effective, the brake cylinder pressure obtained would vary from the value intended to the low or practically useless value. The result of these varying pressures in the brake cylinders on the train might only result in excessive wear of the wheels and brake shoes on certain cars in the train, but at some time the loss of brake cylinder pressure might be so severe throughout the whole train as to permit the train to get out of control and possibly result in a wreck.

One object of my invention is to provide an improved fluid pressure brake equipment in which spring means are employed to control the brake cylinder pressure obtained upon effecting an application of the brakes, in order to obviate the above undesirable condition.

Another object of my invention is to provide an improved fluid pressure brake equipment having spring means for controlling the brake cylinder pressure obtained upon effecting an application of the brakes, means for automatically adjusting the pressure of said spring means when the brake system is fully charged with fluid under pressure and means for automatically locking the spring means in the adjusted condition upon initiating an application of the brakes, so that the control pressure of said spring means will remain constant for an indefinite period, as is required in the descent of a long grade.

According to this last object, the spring means will be adjusted according to the brake pipe pressure carried, such, for example, as seventy, ninety or one hundred ten pounds, as well as according to the brake pipe pressure existing in various parts of the train, as controlled by leakage conditions in the train.

In an equipment of this character, the brake cylinder pressure control device is governed by variations in opposing fluid pressures, and when the brake cylinder pressure, which is generally one of the control pressures, is reduced to a low degree, such, for instance, as five pounds or less, it is difficult at times to obtain sufficient differential between the control pressures to ensure movement of the control device to effect the release of these final few pounds pressure from the brake cylinder.

Another object of my invention is to provide improved means for obviating the last described undesirable condition.

Other objects and advantages will appear in the following more detailed description of the invention.

In the accompanying drawing; Fig. 1 is a diagrammatic view, mainly in section, of a fluid pressure brake equipment embodying the invention; Fig. 2 is a sectional view taken on the line 2—2 of Fig. 1; Fig. 3 is a sectional view taken on the line 3—3 of Fig. 1; Fig. 4 is a sectional view taken on the line 4—4 of Fig. 1; and Fig. 5 is a diagrammatic view of a portion of the valve device shown in Fig. 1 and showing the empty to load change-over valve in the load position.

As shown in the drawing, the invention is preferably associated with an empty and load fluid pressure brake equipment which is quite similar in many respects to the fluid pressure brake equipment disclosed in my pending application hereinbefore referred to and comprises a pipe bracket 1, an application valve mechanism 2 mounted on one face of pipe bracket 1 against a gasket 4, a brake cylinder pressure control valve mechanism 3 mounted on another face of said pipe bracket against a gasket 5, an auxiliary reservoir 6, an empty brake cylinder 7, a load reservoir 8, and a load brake cylinder 9.

The application valve mechanism 2 comprises a triple valve device 10, an inshot valve device 11 and associated therewith is an empty and load change-over valve device 12.

The triple valve device 10 comprises a casing containing a piston 13 forming at one side, in conjunction with a face of the pipe bracket 1, a chamber 14 connected through a passage 15 to a brake pipe 16 and forming at the opposite side a valve chamber 17 communicating with the auxiliary reservoir 6 through passage and pipe 18 and containing a slide valve 20 and a pin type graduating valve 23 slidably mounted in a suitable bore in one end of the slide valve 20 and adapted to control communication from valve chamber 17 to a passage 24 in slide valve 20. The piston 13 is provided with a stem 19 extending into chamber 17 for operating the slide valve 20 and a pin 25 carried by said stem operatively connects the graduating valve 23 to said stem.

The inshot valve device 11 comprises a check valve 26 contained in a chamber 27, a spring 28 contained in said chamber and engaging check valve 26 for urging said check valve into sealing engagement with a seat rib 29, a piston 30, and a stem 31 projecting from said piston and adapted to be operated thereby to move the check valve 26 away from seat rib 29.

A sealing gasket 32 is secured to one face of the inshot valve piston 30 by means of a clamping nut 33 having screw-threaded engagement on the stem 31 at the base thereof. The other face of the inshot valve piston 30 is open to a chamber 34 which is at all times vented to the atmosphere through a passage 35 and which contains a spring 36 acting on said piston for urging said piston to its normal position in which gasket 32 effects a seal against the casing and the check valve 26 is unseated by stem 31. The stem 31 slidably operates through a suitable bore in a partition wall 37 forming at one side a chamber 38 and at the opposite side a chamber 39. Chambers 38 and 39 are in constant communication through passages 40 and 41.

The empty to load change-over valve 12 comprises a casing, a plug valve 42 rotatably mounted in said casing, and a manually operated handle 43 for turning said plug valve from empty position, as shown in Fig. 1, to load position, as shown in Fig. 5, and reverse. The plug valve 42 is subject over its larger end to the pressure of fluid in a chamber 44 which is adapted to be supplied with fluid under pressure from the triple valve chamber 17 through passages 45 and 46. A spring 47 in chamber 44 acts on the plug valve 42 to hold said plug valve seated when the brake system is not charged with fluid under pressure.

The brake cylinder pressure control mechanism 3 comprises a casing made up of five sections 48, 49, 50, 51, and 52, these casing sections being all secured together in the order listed and then, as a unit, secured to the pipe bracket 1 against the gasket 5.

A flexible diaphragm 53 is clamped between the casing sections 48 and 49 and has at one side a chamber 54 which is open at all times to the auxiliary reservoir 6 through passage 55 and passage and pipe 18, and has at the opposite side a chamber 56 which is at all times open to the empty brake cylinder 7 through passages 57 and 58. The opposite side of the brake cylinder chamber 56 is formed by a flexible diaphragm 59 clamped between the casing sections 49 and 50, the opposite side of the flexible diaphragm 59 being exposed to atmospheric pressure in a chamber 60 formed in the casing section 50 and vented to the atmosphere through an opening 61.

Disposed in the atmosphere chamber 60 and engaging one side of diaphragm 59 is a follower member 62 having a stud portion 63 extending through said diaphragm into chamber 56. A follower plate 64 is applied over the stud 63 to the opposite side of diaphragm 59 and is secured in position by means of a nut 65 having screw-threaded engagement with said stud.

The follower member 62 is adapted to engage a stop 66 in the casing section 50 for limiting the deflection of diaphragm 59 in an upwardly direction, while the follower plate 64 is provided with an annular rib 67 adapted to engage an annular rib 68 formed in the casing section 49 for limiting the deflection of diaphragm 59 in the opposite direction. In order that the follower member 62 and follower plate 64 be properly spaced so as to govern the diaphragm deflection, just described, the follower plate 64 is provided around the aperture containing stud 63 with an annular rib 69 adapted to engage the follower member 62 and thus properly position the follower member 62 and follower plate 64 with respect to each other. The thickness of the diaphragm 59 is sufficiently greater than the depth of rib 69, however, to ensure leak-proof compression of said diaphragm.

A follower plate 70 is disposed in chamber 56 on one side of diaphragm 53 and is provided with a stud 71 extending through said diaphragm into chamber 54. A follower plate 72 contained in chamber 54 is applied over the stud 71, and a nut 73 having screw-threaded engagement with said stud is provided to securely clamp the follower plates 70 and 72 to said diaphragm. The follower plate 70 is provided with a plurality of upwardly extending struts 74 normally engaging the follower plate 64 for transmitting pressure from diaphragm 53 to diaphragm 59.

The casing section 49 is provided with a lug 75 extending into the chamber 56, said lug being provided with a passage 76 terminating at one end in a chamber 77 and at the opposite end in a chamber 78, the open end of chamber 78 being positioned substantially centrally below the stud portion 63 of the follower member 62.

Screwed into the open end of chamber 78 is a valve seat plug 79 having a chamber containing a ball valve 80 adapted to seat on a tapered seat formed in said plug. A spring 81 is provided in chamber 78 for urging the ball valve 80 into engagement with its seat. Secured in the ball valve 80 is a pin valve 82 which extends through a relatively large passage in the valve seat plug 79 and into a passage 83 formed in the stud 62, the passage 83 being also relatively large in diameter as compared to the diameter of the pin valve so as to permit flow of fluid under pressure through said passages. In the passage 83 a valve seat 84 is provided and is adapted, under certain conditions, to be moved into engagement with the pin valve 82, the area of the opening through said valve seat being reduced to a predetermined size by means of a choked passage 85.

In Fig. 1 of the drawing, the pin valve 82 is shown unseated and the follower member 62 engaging the stop 66 in the casing section 50. The limited deflection of the diaphragm 59 from the position shown in the drawing to the position in which follower plate 64 engages the rib 68 is adapted to move the valve seat 84 into engagement with the pin valve 82 and then operate the pin valve 82 to unseat the ball valve 80 and it will therefore be evident that when the diaphragm 59 is deflected to an intermediate position both the pin valve 82 and ball valve 80 will be seated.

A valve seat plug 86 is screwed into the casing in the open end of chamber 77 formed in the lug 75. Said plug is provided centrally with an opening 87 leading to a tapered valve seat and a ball valve 88 contained in chamber 77 is pressed into engagement with said seat by means of a spring 89.

According to the invention, a sleeve 90 is mounted on the follower member 62 which is secured to the upper side of the diaphragm 59. This sleeve 90 is adapted to telescope with another sleeve 91, the outer end of sleeve 91 being closed to form a follower member engaging one side of a flexible diaphragm 92 which is clamped between the casing sections 50 and 51. One or more springs 93 and 94 are contained in the chamber formed within the sleeves 90 and 91 and engage the follower member 62 and the closed end of the sleeve 91. These springs are preferably contained in the sleeves 90 and 91 under compression and in order to prevent the sleeves from being pushed apart, particularly in assembling the apparatus, two screws 97 are provided, diametrically opposite each other in the sleeve 91, each of said screws having an extension 98 projecting into an elongated slot 99 provided through the side wall of sleeve 90.

The opposite side of diaphragm 92 is open to a chamber 95 communicating through passages 96 and 18 with the auxiliary reservoir 6. The movement of the diaphragm 92 into chamber 95 is limited by the screws 97 in the sleeve 91 so that auxiliary reservoir pressure will act over the full area of said diaphragm. In case the diaphragm should swell or thicken due to contact with oil, its deflection into chamber 95 is adapted to be limited by engagement with a plurality of ribs 100 formed in the casing section 51 so as to positively ensure that fluid from the auxiliary reservoir may act on the full area of said diaphragm.

When the brake system is fully charged, the pressure of fluid in the auxiliary reservoir, acting in chamber 95 on the diaphragm 92 compresses the springs 93 and 94 until their pressure is equivalent to the auxiliary reservoir pressure. The pressure exerted by these springs on the follower member 62 corresponds to the pressure exerted on a corresponding member by the constant pressure of the fluid in the control reservoir in the pending application hereinbefore mentioned. In order that the pressure of the springs 93 and 94 will not be reduced when the auxiliary reservoir pressure is reduced on diaphragm 92 in effecting an application of the brakes, means are provided for locking said springs in their adjusted position immediately upon initiating an application of the brakes and then maintaining them locked in their adjusted position until the brakes are substantially fully released, as will now be described.

The sleeve 91 is provided with two lugs or fulcrum pins 101 arranged diametrically opposite each other and pivotally mounted on the pins 101 are the arms 102 of a lever member 103. The outer end of each of the arms 102 is provided with a fulcrum pin 104 pivotally extending into a suitable bore in the casing section 50. The opposite end of the lever member 103 is pivotally connected to one end of a rack 105 slidably mounted in a suitable bore in the casing section 51 and extending into a chamber 106 formed in the casing section 52 and slidably engaging a surface 107 in chamber 106. It will be evident that as the springs 93 and 94 are compressed to the value of the auxiliary reservoir pressure acting in chamber 95 on diaphragm 92, the rack 105 will be moved or adjusted to a corresponding position through the movement of the sleeve 91 and the medium of the lever member 103.

In order to lock the rack 105 in the adjusted position upon initiating an application of the brakes, a detent 108 is slidably mounted in a suitable opening through a lug 109 projecting from the casing section 52, and is provided with teeth 110 adapted to effect locking engagement with corresponding teeth on the rack 105. The detent is preferably square or rectangular in cross section and the opening through lug 109 in which the detent is slidably mounted is of the same shape so as to maintain the teeth on the detent aligned with the teeth on the rack 105.

The detent 108 is provided with a rearwardly projecting extension 111 through the medium of which the detent is adapted to be moved into and out of locking engagement with the rack 105. For pulling the detent 108 out of locking engagement with the rack 105, a spring 118 is interposed between a collar 119 mounted on the extension 111 and a washer 120 which is mounted over the extension 111 and engages the lug 109.

For urging the detent into locking engagement with the rack 105 against the opposing pressure of spring 118, the end of the extension 111 is pivotally connected to one arm of a bell crank lever 112 which is pivotally supported on a lug 113 projecting from the casing section 52. The other arm of the bell crank lever 112 is pivotally connected to one end of an operating bar 114. The opposite end of the operating bar 114 is pivotally connected to one end of a lever bar 115 which is pivotally carried by a lug 116 projecting from the casing section 52.

The operating bar 114 is provided intermediate its ends with a fulcrum pin 117 which is carried in a slot formed in one end of a member 146.

The member 146 slidably extends through a suitable bore in one wall of the casing section 52 into a chamber 121 wherein said member is associated with a follower plate 122 carried on one side of a flexible diaphragm 123. The chamber 121 at the side of the diaphragm 123 containing the follower plate 122 is at all times open to the atmosphere through a passage 124, chamber 106, through an opening 125 provided in the casing section 51 for operation of a link 126, which will be hereinafter described, and from opening 125 through chamber 60 and atmospheric opening 61. The diaphragm 123 is open at the opposite side to a chamber 127 adapted to be supplied with fluid under pressure through a passage 128 leading to the seat of slide valve 20 in the triple valve device 10. The deflection of diaphragm 123 by fluid under pressure supplied to chamber 127 is adapted to be limited by engagement of the follower plate 122 with an annular shoulder 129 provided in the casing section 52.

The end of the lever bar 115, opposite to the end connected to the operating bar 114, is pivotally connected to one end of a link 130 the opposite end of which is pivotally connected to one end of a lever 131. The lever 131 is pivotally carried on a lug 132 depending from a cover 133 secured to the casing section 52 for closing the open end of chamber 106. One end of the link 126 is pivotally connected to the other end of lever 131 while the other end of said link is pivotally connected to one end of a lever 134 pivotally carried by a lug 135 projecting from casing section 50. The other end of the lever 134 is forked to provide two arms 136, one of said arms extending around one side of the sleeve 90 and the other of said arms extending around the other side of sleeve 90. Each of the arms 136 is provided adjacent its end with a hook-like portion 137 adapted normally to engage with a pin or lug 138 projecting from the sleeve 90, the two pins 138 being arranged on the sleeve 90 diametrically opposite each other.

The casing section 52 is provided with a lug 139 having a cavity 140 for holding one end of a release bias spring 141, while the other end of said spring engages the lever 131 in a cavity 142 formed in said lever and at all times exerts a pressure on the lever 131 tending to rotate said lever in a counterclockwise direction, and the pressure of said spring acting through the lever 131, link 130 and lever bar 115 on the operating bar 114 exceeds the opposing pressure of spring 118 acting through the bell crank lever 112 on the operating bar 114 for reasons which will be hereinafter described.

In order to maintain looseness in the pivot connection of the lever member 103 to the casing section 50, the sleeve 91 and rack bar 105, taken up in the direction of compressing the springs 93 and 94, a light tension spring 143 is connected between one end of the rack 105 and a finger 144 projecting from the side wall of the casing section 50.

The empty brake cylinder 7 and the load brake cylinder 9 may be of the usual well known type, such as fully described in the pending application hereinbefore mentioned, and since the operation of these brake cylinders does not enter into the invention it is deemed unnecessary to provide a more detailed description.

In operation, in initially charging the fluid pressure brake equipment, fluid under pressure supplied to the brake pipe 16 in the usual well known manner, flows from said brake pipe through passage 15 to the triple valve piston chamber 14. With the triple valve parts in the release position, as shown in the drawing, fluid under pressure supplied to piston chamber 14 flows through a feed groove 145 to the slide valve chamber 17 and from thence through passage 18 to the auxiliary reservoir 6 thus charging the auxiliary reservoir with fluid at the pressure carried in the brake pipe.

Fluid at the pressure in the auxiliary reservoir 6 flows from the auxiliary reservoir passage 18 through passage 55 to diaphragm chamber 54 and through passage 96 to diaphragm chamber 95 in the brake cylinder control mechanism 3. The pressure of fluid in diaphragm chamber 54 upwardly moving the deflects the diaphragm 53 upwardly moving the struts 74 into engagement with the follower plate 64. The pressure of fluid in diaphragm chamber 95 deflects the diaphragm 92 downwardly until the springs 93 and 94 are compressed to a degree where their reaction is equivalent to the pressure applied by the diaphragm 92, hence the pressure exerted by said springs upon the follower member 62 is equivalent to auxiliary reservoir pressure acting upon the diaphragm 92.

The diaphragms 53 and 92 are of the same area, likewise the area of the follower plate 70 and the closed end of the sleeve 91 engaging diaphragm 92 are of the same area, so that the pressure exerted on the springs 93 and 94 and hence on the follower member 62 equals the opposing pressure applied through the medium of the diaphragm 53.

The diaphragm chamber 127 being initially vented, as will be hereinafter described, the diaphragm follower 123 and stem 146 are in their lower position which permits spring 118 to hold the teeth 110 of the detent 108 out of engagement with the rack 105 so that said rack may move as the sleeve 91 is moved in compressing the springs 93 and 94. Also the pressure of spring 141 acting on the lever 131 is adapted to apply pressure through said lever, link 126, and lever member 134 upon the pins 138 in the sleeve 90. Since the pressure of springs 93 and 94 just equals the opposing pressure of fluid in chamber 54 acting on diaphragm 53, the pressure of spring 141 applied to the sleeve 90 provides a bias which holds the sleeves 90 and 91 in the release position in which the follower member 62 engages the stop 66.

In the release position of the sleeves 90 and 91 and follower member 62, the seat 84 is moved away from the pin or release valve 82 so that the brake cylinder chamber 56 is vented to the atmosphere through passage 83, the choked passage 85, chamber 147 within the sleeves 90 and 91, opening 148 through the sleeve 90, chamber 60 and opening 61. The empty brake cylinder 7 being connected through pipe and passage 58 and passage 57 to the brake cylinder chamber 56 is also vented with said chamber.

The brake cylinder passage 57 is connected by passage 40 to chamber 38 in the inshot valve device 11 and by passage 41 to chamber 39 at one side of the inshot valve piston 30, so that both chambers 38 and 39 are vented, and due to chamber 39 being vented, spring 36 is permitted to hold the piston 30 in the position shown in the drawing in which the gasket 32 seals on the casing and the check valve 26 is unseated so that chamber 27 is opened to chamber 39 and thus also vented.

A passage 149 is connected to the vented chamber 27 and leads to the seat of the triple valve slide valve 20. With the slide valve 20 in release position, the diaphragm chamber 127 is vented through passage 128, and a cavity 150 in said slide valve, which cavity connects passage 128 to the vented passage 149, also a quick service reservoir 151 is vented through passage 149 by way of passage 152 which is connected to passage 149 through a cavity 153 in slide valve 20.

With the empty to load change over valve device 12 in the empty position, as shown in the drawing, the load reservoir 8 is vented to the atmosphere through pipe and passage 154, a cavity 155 in the plug valve 42 and an atmospheric passage 156, while the load brake cylinder 9 is also vented to the atmosphere through pipe and passage 157, cavity 155 in the plug valve 42 and atmospheric passage 156. With the empty to load change over valve device 12 in this empty position only the auxiliary reservoir 6 and empty brake cylinder 7 are effective, while if the empty to load change over valve device 12 is in the load position, as shown in Fig. 5, the load reservoir 8 and load brake cylinder 9 are also effective. This operation is fully described in the pending application hereinbefore mentioned and since, insofar as the invention is concerned, the operation of the brake equipment is the same in both positions of the empty to load change over valve, it is deemed unnecessary to hereinafter describe the operation of the equipment when the empty to load change over valve device 12 is in the load position.

If it is desired to effect an application of the brakes, the pressure of fluid in brake pipe 16 and triple valve piston chamber 14 is reduced in the usual manner and upon obtaining a sufficient differential between the pressure in piston chamber 14 and valve chamber 17, the piston 13 is moved outwardly to application position in which it engages the gasket 4. This movement of the piston 13 first pulls the graduating valve 23 away from its seat in slide valve 20, then shoulder 21 on the piston stem 19 engages the end of and moves the slide valve 20 to application position.

In application position of the slide valve 20, cavity 153 connects the brake pipe passage 15 to passage 152 leading to the quick service reservoir 151 so that fluid under pressure is permitted to flow from the brake pipe 16 to said reservoir and effect a local quick service reduction in brake pipe pressure for accelerating serially the operation of the triple valves throughout the train, in the usual well known manner.

With the slide valve 20 in application position fluid at auxiliary reservoir pressure flows from valve chamber 17 to passage 128 and from thence to diaphragm chamber 127 and acts on the diaphragm 123 which is quickly deflected upwardly to the position defined by engagement of the follower plate 122 with shoulder 129. This deflection of diaphragm 123 moves the fulcrum pin 117 upwardly and since spring 141 exerts a greater pressure on one end of the operating bar 114 than spring 118 exerts on the other end, the operating bar 114 initially fulcrums on the pivot pin 158 connecting to lever bar 115 and operates the bell crank lever 112 to move the detent 108 against spring 118 until the teeth 110 on said detent effect locking engagement with the corresponding teeth on the rack. After the detent is moved into locking engagement with rack 105, the pivot pin 159 connecting the bell crank lever 112 to the operating bar 114 becomes a fulcrum so that further deflection of the diaphragm 123 and consequent movement of the fulcrum pin 117 operates the lever bar 115, link 130, lever 131, link 126 and lever 134 against the pressure of spring 141 until, at the time the follower plate 122 engages shoulder 129, the hooked portions 137 of the arms 136 of lever 134 are moved out of engagement with and away from the pins 138 in the sleeve 90, thus removing from sleeve 90 the pressure of the bias spring 141.

At the same time as fluid under pressure is supplied to diaphragm chamber 127 for operating detent 108 to lock the rack 105 so as to maintain the control springs 93 and 94 in their adjusted position and for removing the pressure of bias spring 141 from the sleeve 90, fluid under pressure is also supplied from the auxiliary reservoir 6 through the valve chamber 17, port 24 in the slide valve 20 to passage 149 leading to chamber 27, thence past the normally unseated check valve 26 to chamber 38 and from chamber 38 through passages 40 and 57 and passage and pipe 58 to the empty brake cylinder 7. As fluid under pressure flows through passage 57 to the empty brake cylinder 7, fluid also flows from said passage to chamber 56 in the brake cylinder pressure control valve mechanism 3 and through passage 41 to chamber 39 at one side of the inshot valve piston 30.

When the pressure obtained in the empty brake cylinder 7 and chamber 39 acting on the inshot valve piston 30 is thus built up to a predetermined degree, such as ten pounds, the pressure of spring 36 is overcome and the inshot valve piston 30 is moved outwardly. The initial movement of the piston 30 breaks the seal between the gasket 32 and the casing thereby exposing the full area of said piston to brake cylinder pressure acting in chamber 39 which causes prompt movement of said piston into sealing engagement with a gasket 161, whereupon spring 28 seats the check valve 26 so that the continued supply of fluid under pressure to the brake cylinder can only occur at a restricted rate through a choked passage 162 connecting the supply passage 149 to chamber 38.

The initial inshot of fluid under pressure to the brake cylinder past the check valve 26 is at a rapid rate to provide for prompt operation of the brake cylinder piston 160 to move the usual brake shoes (not shown) into engagement with the car wheels (not shown), after which, the supply of fluid to the brake cylinder is restricted by the choked passage 162 to provide a gradual application of the brakes.

In effecting an application of the brakes as just described, when a slight reduction in auxiliary reservoir pressure is obtained, this reduction being effective in diaphragm chamber 54 on the diaphragm 53 reduces the pressure on said diaphragm below the opposing pressure of the control springs 93 and 94 so that said springs move the follower member 62 downwardly. This movement of the follower member 62 shifts the release valve seat 84 into engagement with the release valve 82 so as to prevent the venting of fluid under pressure from chamber 56 and the empty brake cylinder 7, which is connected to chamber 56 through passage and pipe 58 and passage 57, to the atmosphere by way of chamber 147 within the sleeves 90 and 91, opening 148, chamber 60 and opening 61.

The auxiliary reservoir 6 is so proportioned to the volume created in the empty brake cylinder 7 by a predetermined or standard movement of the brake cylinder piston 160 as to provide a certain pressure in said brake cylinder for each pound reduction in auxiliary reservoir pressure, as for instance, each pound reduction in auxiliary reservoir pressure will provide two and one half pounds pressure in the brake cylinder which pressure is also effective in chamber 56. If the movement of the empty brake cylinder piston is standard, then the increase in pressure in chamber 56 acting on the differential areas of diaphragms 53 and 59 compensates for the reduction in auxiliary reservoir pressure in chamber 54, so that the movement of the follower member 62 by springs 93 and 94 ceases upon seating of the release valve 82.

If, however, the movement of the empty brake cylinder piston 160 is less than the standard, the brake cylinder volume is also less, and consequently the same amount of fluid under pressure from the auxiliary reservoir produces a higher brake cylinder pressure than if the brake cylinder volume were standard. Under this condition, the higher than standard brake cylinder pressure obtained in chamber 56 and acting on the differential areas of diaphragms 53 and 59 unbalances the opposing forces on said diaphragms and aided by auxiliary reservoir pressure in chamber 54 acting on diaphragm 53 deflects said diaphragm upwardly against the constant pressure of springs 93 and 94. The resultant movement of the release valve seat 84 away from the release valve 82 permits fluid under pressure to be vented from chamber 56 and the empty brake cylinder 7 to the atmosphere until the pressure in said chamber and the empty brake cylinder is reduced to the proper relation to the reduction in auxiliary reservoir pressure acting in chamber 54. When the brake cylinder pressure is thus reduced to the proper relation with respect to the reduction in auxiliary reservoir pressure, the constant pressure of control springs 93 and 94 moves the follower member 62 back to the position in which seat 84 engages the release valve 82 so as to prevent further venting of fluid under pressure from the empty brake cylinder.

If the movement of the empty brake cylinder piston 160 is greater than standard, the brake cylinder volume is also greater, so that the pressure obtained in the brake cylinder is lower than that which would be obtained if the movement of the piston were standard. Under this condition, the brake cylinder pressure acting in diaphragm chamber 56, plus the auxiliary reservoir pressure acting in diaphragm chamber 54 is inadequate to balance the opposing and constant pressure of the control springs 93 and 94, so that after seating the release valve 82, the diaphragms 59 and 53 are further deflected by said springs and operate through the release valve 82 to unseat the ball check valve 80 against the opposing pressure of the light spring 81, whereupon fluid under pressure flows from the brake pipe 16 to the brake cylinder 7 by way of pipe and passage 15, chamber 163, opening 87, past the check valve 88, through passage 76, and chamber 78, and then past the unseated ball check valve 80 to chamber 56 and the empty brake cylinder 7. Fluid under pressure is thus supplied from the brake pipe 16 to the empty brake cylinder 7 until the pressure obtained in said brake cylinder and in diaphragm chamber 56 is increased to the proper value relative to the reduction in auxiliary reservoir pressure. When this proper relation between brake cylinder pressure and auxiliary reservoir pressure is obtained, these pressures acting on diaphragms 53 and 59 move said diaphragms against the opposing and constant pressure of the control springs 93 and 94 and permit the ball check valve 80 to seat so as to prevent further flow of fluid under pressure from the brake pipe to the brake cylinder.

If the pressure in the empty brake cylinder and diaphragm chamber 56 should reduce due to leakage, the equilibrium of pressures on the diaphragms 53 and 59 will be destroyed and permit the pressure of the control springs 93 and 94 to deflect said diaphragms and unseat the ball check valve 80 so as to permit fluid under pressure to be supplied from the brake pipe to the brake cylinder to compensate for said leakage, in the same manner that fluid under pressure is supplied from the brake pipe to the brake cylinder in case of excess travel of the brake cylinder piston 161.

If the brake pipe pressure is reduced to below the pressure at which the auxiliary reservoir equalizes into the brake cylinder 7, it will then be evident that the pressure in said brake cylinder can not be maintained from the brake pipe. Under such a condition, the ball check valve 80 will be unseated as above described and in order to prevent the flow of fluid at the higher pressure in the empty brake cylinder and chamber 56 past the check valve 80 to the lower pressure in the brake pipe, the ball valve 88 is pressed into engagement with its seat by means of spring 89 and brake cylinder pressure acting in chamber 77.

In order to effect a release of the brakes after an application, fluid under pressure is supplied to the brake pipe 16 and piston chamber 14 of the triple valve device 10. When the pressure in piston chamber 14 is thus increased a predetermined degree above the auxiliary reservoir pressure in valve chamber 17, the piston 13 is operated and seats the graduating valve 23 and then moves the slide valve 20 to release or charging position, as shown in the drawing.

When the slide valve 20 moves to release position, the application port 24 is moved out of registry with passage 149 through which fluid under pressure was supplied to the empty brake cylinder 7 in effecting an application of the brakes, and diaphragm chamber 127 is connected to said passage through passage 128 and cavity 150 in slide valve 20 so that brake cylinder pressure becomes effective on the diaphragm 123 to maintain the detent 108 in locking engagement with the rack 105 and also to maintain the bias spring 141 compressed and therefore ineffective. The quick service reservoir 151 is also placed in communication with the brake cylinder passage 149 through passage 152 and cavity 153 in slide valve 20. These communications are established so that the pressure of fluid in diaphragm chamber 127 and in the quick service reservoir 151 reduces with the pressure in the empty brake cylinder upon releasing fluid under pressure from said brake cylinder, as will now be described.

In the release position of the triple valve device, fluid under pressure supplied from the brake pipe 16 to piston chamber 14 flows through feed groove 145 to valve chamber 17 and from thence through passage and pipe 18 to the auxiliary reservoir 6. Fluid under pressure also flows from passage 18 through passage 96 to diaphragm chamber 95 and through passage 55 to diaphragm chamber 54.

The increase in auxiliary reservoir pressure in chamber 54 acting on diaphragm 53, plus the brake cylinder pressure in chamber 56 acting on the differential areas of diaphragms 59 and 53 overcomes the opposing, constant pressure of springs 93 and 94 and deflects the diaphragms 53 and 59 upwardly, thereby moving the release valve seat 84 out of engagement with the release valve 82, which permits fluid under pressure to be released from the empty brake cylinder 7 through pipe and passage 58, passage 57, chamber 56, past the release valve 82 to chamber 147 within the sleeves 90 and 91, through opening 148, chamber 60 and opening 61 to the atmosphere. The rate at which fluid under pressure can be thus released from the empty brake cylinder is controlled by the flow area of choked passage 85, said choked passage being smaller than the flow area of openings 148 and 61, so that fluid under pressure vented through chambers 147 and 60 is not permitted to build up a pressure on diaphragm 59 and influence the control of said diaphragm by the constant pressure of springs 93 and 94.

In order to graduate the release of the brakes, the increase in brake pipe pressure, and consequently the increase in pressure in the auxiliary reservoir 6 and diaphragm chamber 54, is limited to an amount governed by the degree of release desired.

The brake cylinder pressure control mechanism 3 responds to the increase in auxiliary reservoir pressure to vent fluid under pressure from the empty brake cylinder, as above described. When the pressure in the empty brake cylinder and in diaphragm chamber 56 is thus reduced a degree slightly exceeding the proportionate degree of increase in auxiliary reservoir pressure acting in diaphragm chamber 54, the constant pressure of the control springs 93 and 94 overcomes the opposing, reduced brake cylinder pressure in chamber 56 acting on the differential areas of diaphragms 53 and 59, and the auxiliary reservoir pressure in chamber 54 acting on diaphragm 53, and deflects said diaphragms so as to move the release valve seat 84 into engagement with the release valve 82 and thereby prevent further venting of fluid under pressure from the empty brake cylinder.

When it is desired to effect another step of reduction in brake cylinder pressure, the brake pipe pressure is again increased an amount according to the degree of release desired. The consequent increase in auxiliary reservoir pressure in diaphragm chamber 54 then causes the brake cylinder pressure control mechanism to again operate to effect a further and proportionate reduction in pressure in the empty brake cylinder 7. In this manner the pressure in the empty brake cylinder may be graduated off or reduced in steps according to the steps of increase in brake pipe pressure, as desired.

Since chamber 39 at one side of the inshot valve piston 30 communicates through passages 41 and 57 with the brake cylinder chamber 56 in the control valve mechanism 3, the pressure in chamber 39 reduces as the brake cylinder pressure reduces and when reduced to a predetermined degree, spring 36 returns said piston to its normal position as shown in the drawing. This movement of piston 30 to its normal position unseats the check valve 26, preparatory to a subsequent application of the brakes.

When the triple valve device is moved to release position, communication is established between diaphragm chamber 127 and the empty brake cylinder, as hereinbefore described, so that fluid at brake cylinder pressure will act in said chamber on diaphragm 123 to maintain the detent 108 in locking engagement with rack 105 and also to maintain the bias spring 141 compressed and ineffective. The pressure in the diaphragm chamber 127 reduces however with brake cylinder pressure, as the brakes are released, and when reduced to a predetermined low degree, just balances the opposing pressure of the bias spring 141. Then upon further reduction in brake cylinder pressure acting on diaphragm 123, the bias spring 141 predominates and is adapted to rotate the lever 131 in a counter-clockwise direction so as to move the hook-like portion 137 of the arms 136 of lever 134 into engagement with pins 138 on sleeve 90 and apply pressure to said pins which aids the auxiliary reservoir pressure in chamber 54 acting on diaphragm 53 to move the sleeve 90 and follower member 62 to the release position. The pressure thus applied to sleeve 90 by the bias spring 141 increases as the opposing brake cylinder pressure in diaphragm chamber 127 acting on diaphragm 123 reduces, so that at the time the fluid under pressure is completely vented from the brake cylinder and the auxiliary reservoir pressure acting on diaphragm 53 is increased to normal and balances the pressure of the control springs 93 and 94, the brake cylinder pressure control mechanism is held in its release position by the full pressure of the bias spring 141 applied through the lever 131, link 126 and lever 134.

When the pressure of the bias spring 141 on one end of the operating bar 114 becomes reduced, in the manner above described, to below the opposing pressure of the detent spring 118 acting on the other end, the spring 118 acting through the bell crank lever 112 moves the diaphragm follower 122 and diaphragm 123 back to the normal position and in so doing pulls the detent 108 out of locking engagement with the rack 105. With the rack 105 thus free to move, the auxiliary reservoir pressure acting in chamber 95 controls the pressure of the control springs 93 and 94 until a subsequent application of the brakes is effected.

In controlling a train, provided with this improved equipment, down a descending grade, the brakes will be alternately applied, then partially released, and then reapplied, but in releasing, the brake cylinder pressure will never be reduced to as low a pressure as required to permit unlocking of the detent 108 from the rack 105, so that the pressure of the control springs 93 and 94 will remain the same during the entire descent of the grade. As a result, the same brake cylinder pressure will be obtained upon the last reduction effected in brake pipe pressure near the foot of the grade as was obtained upon the initial reduction in brake pipe pressure upon starting the descent of the grade.

It will be noted that the control springs 93 and 94 are adjusted, when the brakes are released, to exert a pressure on the diaphragm 59 equal to the pressure of fluid obtained in the auxiliary reservoir, which corresponds to the pressure of fluid in the brake pipe, so that the pressure of said control springs will automatically vary according to the brake pipe pressure carried. It is well known that, due to brake pipe leakage, the pressure of fluid obtained in the different parts of a train varies, that is, if it is intended to carry seventy pounds pressure in the brake pipe, this pressure will be obtained at the front end of the train but if there is brake pipe leakage, the pressure obtained in the brake pipe at the rear end of the train will be somewhat less. However, irrespective of the degree of brake pipe pressure, the control springs 93 and 94 will be adjusted to exert a corresponding pressure on the diaphragm 59, and since the springs 93 and 94 are locked in their adjusted position immediately upon initiating an application of the brakes, the pressure of said springs on diaphragm 59 will remain constant during the entire period that the brakes are applied.

It will now be noted that an improved fluid pressure brake equipment is provided having control springs adjusted according to the brake pipe pressure, while the brakes are released, to control the pressure obtained in the brake cylinder according to the reduction or increase in brake pipe pressure. These control springs are locked in their adjusted position immediately upon initiating a reduction in brake pipe pressure and are maintained locked in their adjusted position until, upon effecting a release of the brakes, the brake cylinder pressure is substantially fully released, so that, while the brakes are applied, the pressure acting in the brake cylinder will bear a predetermined relation to the degree of reduction in brake pipe pressure irrespective of the length of time which the brakes are maintained applied, and irrespective of variations in the travel of the brake cylinder piston or leakage of fluid under pressure from the brake cylinder within a permissible degree. A further feature of the invention lies in the spring biasing means which become operative upon the brake cylinder pressure control mechanism, when the brake cylinder pressure is reduced to a predetermined low degree, to ensure movement of said mechanism to release position for effecting a complete release of fluid under pressure from the brake cylinder. The pressure of the spring biasing means is removed from the brake cylinder pressure control mechanism when the brake cylinder pressure exceeds the predetermined low degree, above mentioned, in order not to influence the operation of said mechanism to maintain the proper relation between brake cylinder pressure and brake pipe reduction, when the brakes are applied.

The inshot valve device 11 for controlling the build up of brake cylinder pressure in effecting an application of the brakes is claimed in my pending application Serial No. 612,465, filed May 20, 1932, and the subject matter relating to the brake cylinder pressure control valve mechanism 3 is broadly claimed in my pending application Serial No. 631,191, filed August 31, 1932.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, an auxiliary reservoir normally charged with fluid at the pressure carried in said brake pipe, and a brake cylinder to which fluid under pressure is supplied from said auxiliary reservoir for applying the brakes upon a reduction in brake pipe pressure and from which fluid under pressure is vented to release the brakes upon an increase in brake pipe pressure, of valve means for regulating the pressure obtained in said brake cylinder in accordance with the degree of reduction and increase in brake pipe pressure, pressure exerting means for controlling the operation of said valve means, means for adjusting the pressure of said pressure exerting means according to the pressure obtained in the auxiliary reservoir when the brakes are released, and means operated by auxiliary reservoir pressure upon a reduction in brake pipe pressure for locking said pressure exerting means in the adjusted condition upon effecting a reduction in brake pipe pressure, and operated by brake cylinder pressure upon an increase in brake pipe pressure for maintaining said pressure exerting means locked in the adjusted condition.

2. In a fluid pressure brake, the combination with a brake pipe, an auxiliary reservoir normally charged with fluid at the pressure carried in said brake pipe, and a brake cylinder to which fluid under pressure is supplied from said auxiliary reservoir for applying the brakes upon a reduction in brake pipe pressure, and from which fluid under pressure is vented to effect a release of the brakes upon an increase in brake pipe pressure, of valve means for regulating the pressure in said brake cylinder in accordance with the degree of reduction and increase in brake pipe pressure, continually acting pressure exerting means for controlling the operation of said valve means, means operated by auxiliary reservoir pressure when the brakes are released for adjusting the acting pressure of said pressure exerting means and means operative by auxiliary reservoir pressure upon a reduction in brake pipe pressure and by brake cylinder pressure upon an increase in brake pipe pressure for locking said pressure exerting means in the adjusted condition.

3. In a fluid pressure brake, the combination with a brake pipe, an auxiliary reservoir normally charged with fluid at the pressure carried in said brake pipe, and a brake cylinder to which fluid under pressure is supplied from said auxiliary reservoir for applying the brakes upon a reduction in brake pipe pressure, and from which fluid under pressure is vented to effect a release of the brakes upon an increase in brake pipe pressure, of valve means for regulating the pressure in said brake cylinder in accordance with the degree of reduction and increase in brake pipe pressure, continually acting pressure exerting means for controlling the operation of said valve means, means operated by auxiliary reservoir pressure when the brakes are released for adjusting the acting pressure of said pressure exerting means and means operative by auxiliary reservoir pressure upon initiating a reduction in brake pipe pressure and by brake cylinder pressure until the brake cylinder pressure is substantially completely vented upon an increase in brake pipe pressure for locking said pressure exerting means in the adjusted condition.

4. In a fluid pressure brake, the combination with a brake pipe, an auxiliary reservoir normally charged with fluid at the pressure carried in said brake pipe, and a brake cylinder to which fluid under pressure is supplied from said auxiliary reservoir for applying the brakes upon a reduction in brake pipe pressure, and from which fluid under pressure is vented to effect a release of the brakes upon an increase in brake pipe pressure, of valve means subject to the pressures of fluid in said brake cylinder and auxiliary reservoir for regulating the pressure in said brake cylinder in accordance with the degree of reduction and increase in brake pipe pressure, continually acting pressure exerting means opposing the pressures of fluid in said brake cylinder and auxiliary reservoir on said valve means, means for adjusting the pressure of said pressure exerting means in accordance with the pressure in said auxiliary reservoir when the brakes are released, and means operated by auxiliary reservoir pressure in effecting an application of the brakes and by brake cylinder pressure in effecting a release of the brakes for locking said pressure exerting means in the adjusted condition.

5. In a fluid pressure brake, the combination with a brake pipe, an auxiliary reservoir normally charged with fluid under pressure from said brake pipe, and a brake cylinder to which fluid under pressure is supplied from the auxiliary reservoir upon a reduction in brake pipe pressure to apply the brakes, and from which fluid under pressure is vented upon an increase in brake pipe pressure to release the brakes, and valve means subject to brake cylinder pressure and fluid under brake pipe pressure operative to regulate the pressure in said brake cylinder according to the degree of reduction and increase in brake pipe pressure, spring means acting on said valve means in opposition to said brake cylinder pressure and said fluid under brake pipe pressure, a movable abutment subject to auxiliary reservoir pressure for varying the pressure of said spring means on said valve means according to the pressure obtained in the auxiliary reservoir when the brakes are released, and means operated by fluid under pressure for locking said spring means in the adjusted condition upon initiating an application of the brakes and until the brakes are substantially released.

6. In a fluid pressure brake, the combination with a brake pipe, an auxiliary reservoir normally charged with fluid under pressure from said brake pipe, and a brake cylinder to which fluid under pressure is supplied from the auxiliary reservoir upon a reduction in brake pipe pressure to apply the brakes, and from which fluid under pressure is vented upon an increase in brake pipe pressure to release the brakes, and valve means subject to brake cylinder pressure and fluid under brake pipe pressure operative to regulate the pressure in said brake cylinder according to the degree of reduction and increase in brake pipe pressure, spring means acting on said valve means in opposition to said brake cylinder pressure and said fluid under brake pipe pressure, a movable abutment subject to auxiliary reservoir pressure for varying the pressure of said spring means on said valve means according to the pressure obtained in the auxiliary reservoir when the brakes are released, a member associated with said abutment and movable thereby to a position to correspond to the adjustment of said spring means, locking means movable by fluid under pressure into locking engagement with said member upon a reduction in brake pipe pressure, a valve device controlled by brake pipe pressure and operative upon a reduction in brake pipe pressure to supply fluid under pressure for effecting the operation of said locking means and operative upon an increase in brake pipe pressure to supply fluid under pressure from said brake cylinder for effecting the operation of said locking means and means operative when the brake cylinder pressure is reduced to a predetermined degree to move said locking means out of locking engagement with said member.

7. In a fluid pressure brake, the combination with a brake pipe, an auxiliary reservoir, a brake cylinder and a valve device subject to the opposing pressures of the brake pipe and auxiliary reservoir and operative upon a reduction in brake pipe pressure to supply fluid under pressure from said auxiliary reservoir to said brake cylinder to apply the brakes, and operative upon an increase in brake pipe pressure to supply fluid under pressure from said brake pipe to said auxiliary reservoir, of valve means subject to brake cylinder pressure and fluid under brake pipe pressure for regulating the pressure in said brake cylinder in accordance with the reduction and increase in brake pipe pressure and operative upon an increase in brake pipe pressure to vent fluid under pressure from said brake cylinder to effect a release of the brakes, a spring at all times under compression opposing the pressures of said brake cylinder and fluid under brake pipe pressure on said valve means for controlling the operation of said valve means, a movable abutment associated with said spring, said movable abutment being subject to auxiliary reservoir pressure and movable thereby to exert a corresponding pressure on said spring, a member associated with said abutment and positioned according to the pressure of said spring, means movable by fluid under pressure into locking engagement with said member, and a movable abutment for moving said means, said valve device being operative upon a reduction in brake pipe pressure to supply fluid under brake pipe pressure for operating the last mentioned abutment to move said means into locking engagement with said member and operative upon an increase in brake pipe pressure to supply fluid under pressure from said brake cylinder for operating the last mentioned abutment to hold said means in locking engagement with said member, and a spring operative when the brake cylinder pressure is reduced to a predetermined low degree for moving said means out of locking engagement with said member.

8. In a fluid pressure brake, the combination with a brake pipe, an auxiliary reservoir normally charged with fluid under pressure from said brake pipe, and a brake cylinder to which fluid under pressure is supplied from the auxiliary reservoir upon a reduction in brake pipe pressure to apply the brakes, and from which fluid under pressure is vented upon an increase in brake pipe pressure to release the brakes, and valve means subject to brake cylinder pressure and fluid under brake pipe pressure operative to regulate the pressure in said brake cylinder according to the degree of reduction and increase in brake pipe pressure, said valve means comprising a movable abutment, a spring acting on said abutment in opposition to the brake cylinder pressure and fluid under brake pipe pressure, a movable abutment subject to auxiliary reservoir pressure and operative to compress said spring according to the pressure of fluid in the auxiliary reservoir, a rack associated with the last mentioned abutment and movable thereby to a position corresponding to the degree of compression of said spring, a detent movable into and out of locking engagement with said rack, an abutment operated by fluid under brake pipe pressure in effecting an application of the brakes for moving said detent into locking engagement with said rack and operated by fluid under pressure from the brake cylinder in effecting a release of the brakes for holding said detent in locking engagement with said rack, valve means operated in accordance with the reduction and increase in brake pipe pressure for establishing the communication through which fluid under pressure is supplied for operating said abutment, and a spring for moving said detent out of locking engagement with said rack upon a substantially complete venting of fluid under pressure from the brake cylinder.

9. In a fluid pressure brake, the combination with a brake pipe, an auxiliary reservoir normally charged with fluid at brake pipe pressure and a brake cylinder to which fluid under pressure is supplied from said auxiliary reservoir to apply the brakes upon a reduction in brake pipe pressure, valve means subject to brake cylinder pressure and auxiliary reservoir pressure and movable by an increase in auxiliary reservoir pressure to a release position for venting fluid under pressure from said brake cylinder, and movable upon a reduction in brake cylinder pressure in proportion to the increase in auxiliary reservoir pressure to another position for closing the communication through which fluid under pressure is vented from the brake cylinder, constant pressure means opposing the brake cylinder and auxiliary reservoir pressures on said valve means with a pressure equal to auxiliary reservoir pressure when the brakes are released for controlling the operation of said valve means, a spring acting on said valve means for moving said valve means to said release position, and means operated by fluid at brake pipe pressure when the brakes are applied for rendering said spring ineffective.

10. In a fluid pressure brake, the combination with a brake pipe, an auxiliary reservoir normally charged with fluid at brake pipe pressure and a brake cylinder to which fluid under pressure is supplied from said auxiliary reservoir to apply the brakes upon a reduction in brake pipe pressure, valve means subject to brake cylinder pressure and auxiliary reservoir pressure and movable by an increase in auxiliary reservoir pressure to a release position for venting fluid under pressure from said brake cylinder, and movable upon a reduction in brake cylinder pressure in proportion to the increase in auxiliary reservoir pressure to another position for closing the communication through which fluid under pressure is vented from the brake cylinder, constant pressure means opposing the brake cylinder and auxiliary reservoir pressures on said valve means with a pressure equal to auxiliary reservoir pressure when the brakes are released for controlling the operation of said valve means, a spring acting on said valve means for moving said valve means to said release position, means operated by fluid at brake pipe pressure upon effecting an application of the brakes and by brake cylinder pressure upon effecting a release of the brakes for rendering said spring ineffective, and a valve device operative in accordance with variations in brake pipe pressure for establishing the communication through which fluid under pressure is supplied for effecting the operation of said means.

11. In a fluid pressure brake, the combination with a brake pipe, an auxiliary reservoir and a brake cylinder, of a valve device operated upon a reduction in brake pipe pressure to supply fluid under pressure from said auxiliary reservoir to said brake cylinder to apply the brakes and operative upon an increase in brake pipe pressure to supply fluid under pressure from said brake pipe to said auxiliary reservoir, valve means subject to auxiliary reservoir pressure and brake cylinder pressure for regulating the pressure in said brake cylinder in accordance with the reduction in brake pipe pressure and for venting fluid under pressure from said brake cylinder upon an increase in brake pipe pressure, continually acting pressure exerting means opposing the pressure of the brake cylinder and auxiliary reservoir on said valve means for controlling the operation thereof, means for adjusting the pressure of said pressure exerting means according to the pressure in said auxiliary reservoir when the brakes are released, a member for locking said means in the adjusted condition, spring means for moving said valve means to the position for venting the brake cylinder, a movable abutment operated by fluid under pressure for effecting the operation of said member to lock said means in the adjusted condition and for rendering said spring means ineffective said valve device being operative upon a reduction in brake pipe pressure to supply fluid under brake pipe pressure for effecting the operation of said movable abutment and upon an increase in brake pipe pressure to supply fluid under pressure from said brake cylinder for effecting the operation of said movable abutment, and spring means operated when the brake cylinder pressure acting on said movable abutment is reduced to a predetermined degree for operating said member to unlock said means.

CLYDE C. FARMER.